United States Patent
Patel et al.

[11] Patent Number: 6,148,980
[45] Date of Patent: *Nov. 21, 2000

[54] FORCE TRANSMITTING ASSEMBLY

[75] Inventors: Kirit R. Patel; Richard F. Plantan, both of North Royalton; James M. Latsko, Parma, all of Ohio

[73] Assignee: Eaton Corporation, Cleveland, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 09/004,007

[22] Filed: Jan. 7, 1998

[51] Int. Cl.$^7$ ........................................................ F16D 11/06
[52] U.S. Cl. ........................................ 192/52.4; 192/85 AA
[58] Field of Search ............................ 192/70.28, 70.26, 192/52.4, 85 AA, 88 A; 188/71.5

[56] References Cited

U.S. PATENT DOCUMENTS

| | | | |
|---|---|---|---|
| 2,890,777 | 6/1959 | Weiland | 192/85 |
| 3,537,556 | 11/1970 | Pfeffer | 192/70.28 |
| 3,858,698 | 1/1975 | Hause | 192/89 R |
| 4,609,076 | 9/1986 | Collins et al. | |
| 4,907,683 | 3/1990 | Patel | |
| 5,383,544 | 1/1995 | Patel | |
| 5,586,635 | 12/1996 | Nelson et al. | 192/85 A |

*Primary Examiner*—Charles A. Marmor
*Assistant Examiner*—Tisha D. Waddell
*Attorney, Agent, or Firm*—Tarolli, Sundheim, Covell, Tummino & Szabo L.L.P.

[57] ABSTRACT

A force transmitting assembly is operable between a plurality of engaged conditions and a disengaged condition in which the force transmitting assembly is ineffective to transmit force. The force transmitting assembly includes a primary piston assembly having annular radially inner and outer piston areas against which fluid pressure is applied to vary the magnitude of the force which can be transmitted by the force transmitting assembly. The force transmitting assembly also includes a secondary piston assembly having radially inner and outer piston areas against which fluid pressure is applied to vary the magnitude of the force which can be transmitted by the force transmitting assembly. In one embodiment of the invention, the secondary piston assembly includes two separate pistons. In another embodiment of the embodiment of the invention, the secondary piston assembly includes a single piston having annular radially inner, radially outer, and intermediate piston areas against which fluid pressure is applied.

35 Claims, 7 Drawing Sheets

FORCE TRANSMITTING ASSEMBLY

BACKGROUND OF THE INVENTION

The present invention relates to a new and improved force transmitting assembly which is operable between a plurality of engaged conditions and a disengaged condition.

A known force transmitting assembly includes a rotor assembly and a base assembly. The rotor assembly includes a hub upon which axially movable annular friction disc assemblies are disposed. The base assembly includes left and right end sections which are disposed in a coaxial relationship with the hub.

Studs extend between and interconnect the left and right end sections of the known force transmitting assembly. Annular reaction disc assemblies are disposed between the friction disc assemblies. Annular pressure plate assemblies are disposed at opposite ends of the rotary assembly and apply pressure against the axially outer friction disc assemblies.

A primary piston assembly is provided to move one of the pressure plate assemblies against the influence of biasing springs to disengage the known force transmitting assembly. A secondary piston assembly is provided to vary or modulate the magnitude of the force being transmitted through the force transmitting assembly. A force transmitting assembly having this construction is disclosed in U.S. Pat. No. 4,609,076 issued Sep. 2, 1986.

SUMMARY OF THE INVENTION

The present invention provides a new and improved force transmitting assembly which is operable between a plurality of engaged conditions and a disengaged condition. The force transmitting assembly includes first and second piston areas. Fluid pressure is applied against the first piston area to effect the transmission of force of a first magnitude. Fluid pressure is applied against the second piston area to effect the transmission of force of a second magnitude. The first and second piston areas are disposed in one axial end portion of the force transmitting assembly.

In addition, the force transmitting assembly may include third and fourth piston areas against which fluid pressure is applied to vary the magnitude of the force transmitted by the force transmitting assembly. The third and fourth piston areas are disposed in an axial end portion of the force transmitting assembly opposite from the end portion in which the first and second piston areas are disposed.

BRIEF DESCRIPTION OF THE DRAWINGS

The foregoing and other features of the invention will become more apparent upon a consideration of the following description taken in connection with the accompanying drawings wherein.

DESCRIPTION OF SPECIFIC PREFERRED EMBODIMENTS OF THE INVENTION

Force Transmitting Assembly—General Description

A force transmitting assembly 10 (FIGS. 1 and 2) may be used as either a clutch or brake. The force transmitting assembly 10 is operable between a plurality of engaged conditions in which it is operable to transmit forces of different magnitudes and a disengaged condition in which the force transmitting assembly is ineffective to transmit force. The force transmitting assembly 10 includes a rotor assembly 12 (FIG. 2) and a base assembly 14.

When the force transmitting assembly 10 is used as a brake, the base assembly 14 is stationary. The rotor assembly 12 is rotatable relative to the base assembly 14 when the force transmitting assembly 10 is in a disengaged condition. Upon operation of the force transmitting assembly 10 to any one of a plurality of engaged conditions, the force transmitting assembly is effective to either hold the rotor assembly 12 against rotation relative to the base assembly 14 or to allow the rotor assembly to rotate while force is transmitted between the rotor assembly and base assembly. Although the force transmitting assembly 10 will be described herein as being used as a brake, it should be understood that the force transmitting assembly can be used as a clutch.

Figure 1:
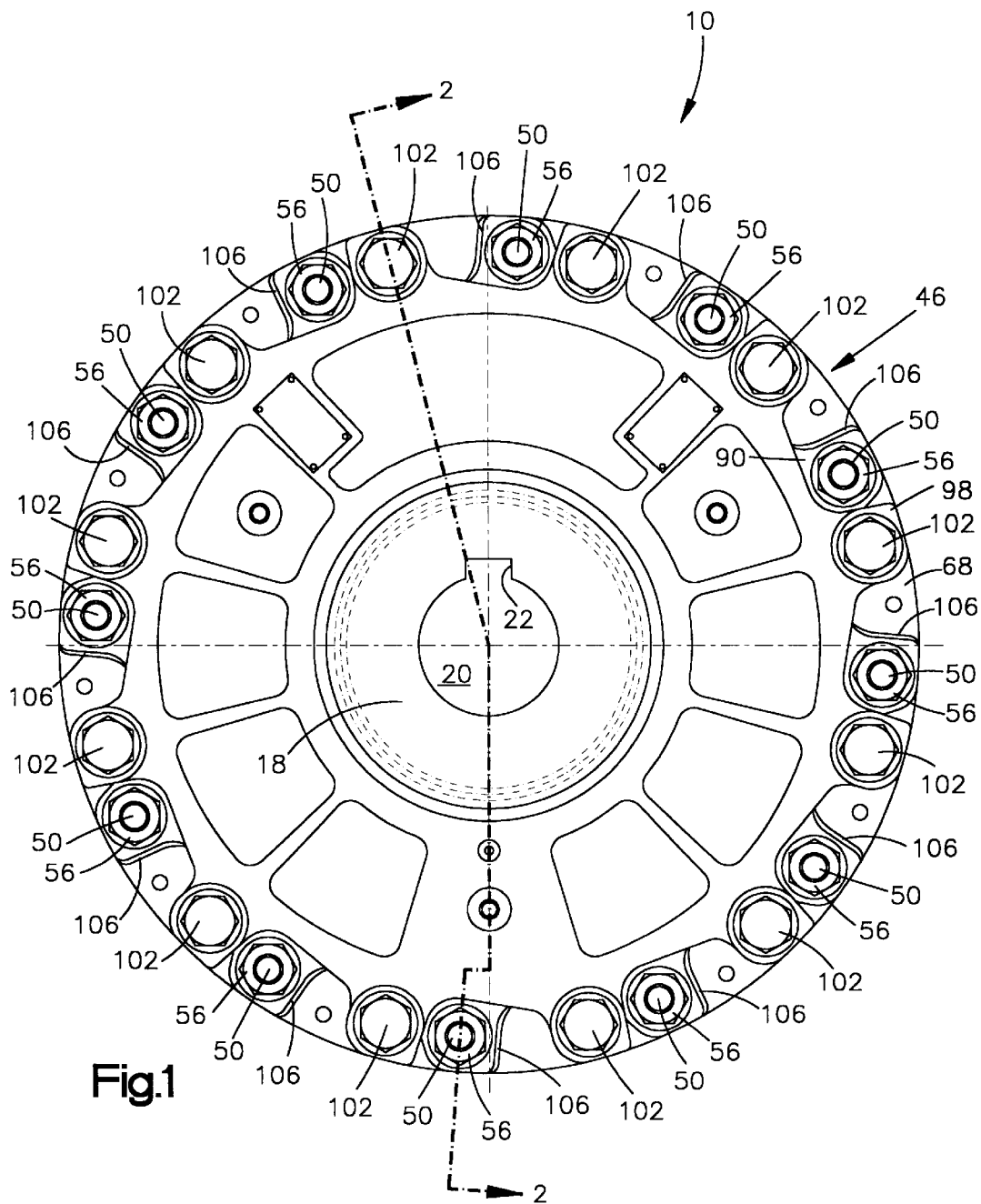
FIG. 1 is an end view of a force transmitting assembly constructed in accordance with the present invention.
Figure 2:
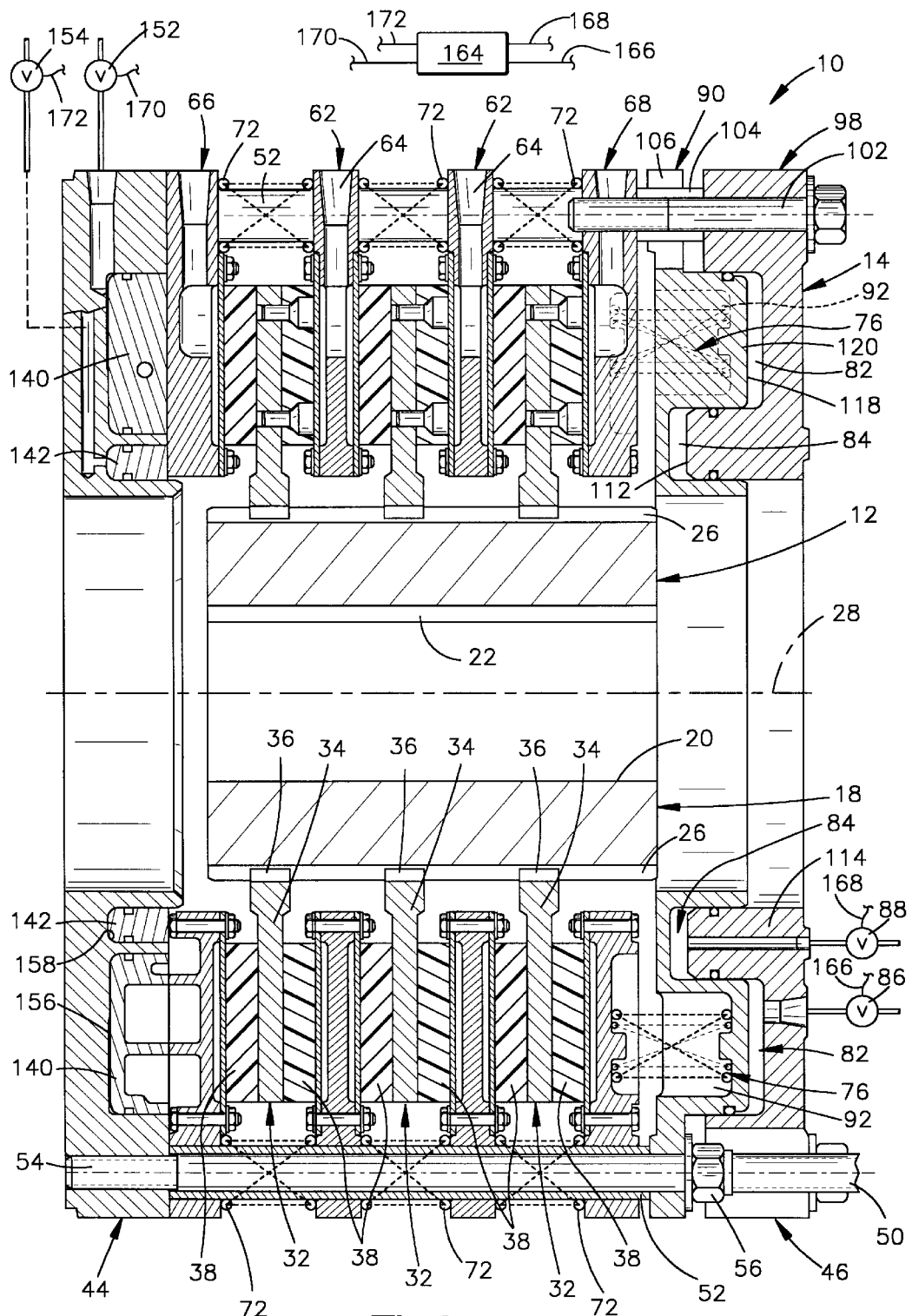
FIG. 2 is an enlarged sectional view, taken generally along the line 2—2 of FIG. 1, further illustrating the construction of the force transmitting assembly.

The rotor assembly 12 includes a generally cylindrical metal hub 18 (FIGS. 1 and 2). The hub 18 has generally cylindrical central opening or passage 20 which receives a shaft. The shaft is fixedly connected with the hub 18 by a suitable key which is received in a keyway 22 formed in the hub 18. If desired, splines may be used to connect the hub 18 with the shaft.

Straight radially outwardly extending splines or teeth 26 (FIG. 2) are disposed in an annular array about the periphery of the hub 18. The teeth 26 have straight longitudinal central axes which extend parallel to the keyway 22 and to a longitudinal central axis 28 of the force transmitting assembly 10.

Annular friction or force transmitting discs assemblies 32 (FIG. 2) are connected with the hub 18. The annular friction disc assemblies 32 are disposed in a coaxial relationship with the hub 18. The friction disc assemblies 32 engage the splines 26 to retain the friction disc assemblies against rotation relative to the hub 18. However, the splines 26 enable the friction disc assemblies 32 to slide axially along the hub 18.

Each of the friction disc assemblies 32 includes an annular metal core or base 34. The core 34 of each of the friction disc assemblies 32 has a generally circular central opening with radially inwardly extending teeth 36 which engage the splines 26 on the hub 28. The teeth 36 on the core or base 34 of the friction disc assembly 32 are slidable axially along the splines 26 on the hub 18. However, the teeth 36 cooperate with the splines 26 to block rotational movement of the core 34 of the friction disc assembly relative to the hub.

Annular friction discs 38 are fixedly connected with opposite sides of each of the cores 34 of the friction disc assemblies 32. The friction discs 38 may be secured to the cores 34 of the friction disc assemblies 32 by suitable fasteners, such as flat head screws. Although the force transmitting assembly 10 three friction disc assemblies 32, the force transmitting assembly 10 could have either a greater or lesser number of friction disc assemblies if desired.

The base assembly 14 is stationary when the force transmitting assembly 10 is used as a brake. When the force transmitting assembly 10 is in a disengaged condition, the rotor assembly 12 is rotated relative to the base assembly 14 by a shaft (not shown) which engages the hub 18. When the force transmitting assembly is in a fully engaged condition, the base assembly 14 holds the rotor assembly 12 against rotation.

The base assembly 14 includes a left or mounting end section 44 and a right or spring end section 46 (FIG. 2). The left and right end sections 44 and 46 have an annular configurations and are disposed in a coaxial relationship with the friction disc assemblies 32 and hub 18. The left and right end sections 44 and 46 are interconnected by a plurality of studs 50 which are disposed in an annular array (FIG. 1).

Each of the studs 50 is enclosed by a cylindrical clamp tube 52 (FIG. 2). A left (as viewed in FIG. 2) end of each of the studs is threaded into the left end section 44 of the base assembly 14. Lock nuts 56 engage the opposite end portions of the studs 50.

Annular reaction disc assemblies 62 are disposed in a coaxial relationship with the left and right end sections 44 and 46 and the friction disc assemblies 32 of the force transmitting assembly 10. The reaction disc assemblies 62 are disposed between the friction disc assemblies 32. The reaction disc assemblies 62 are held against rotation relative to the base assembly 14 by the studs 50.

The reaction disc assemblies 62 (FIG. 2) are slidably mounted on the cylindrical clamp tube 52. The reaction disc assemblies 62 are axially movable along the clamp tubes 52 and studs 50. However, the clamp tubes 52 and studs 50 cooperate to hold the reaction disc assemblies 62 against rotational movement relative to the base assembly 14.

Passages 64 are provided in the reaction disc assemblies 62 to accommodate cooling liquid, that is, water. The flow of water through the passages 64 in the reaction disc assemblies 62 conducts heat away from the reaction disc assemblies in a known manner during operation of the force transmitting assembly 10.

Annular pressure plate assembles 66 and 68 are disposed in a coaxial relationship with the reaction disc assemblies 62 and friction disc assemblies 32. The pressure plate assembly 66 is disposed adjacent to the left mounting end section 44 of the base assembly 14 while the pressure plate assembly 68 is disposed adjacent to the right end section 46 of the base assembly 14. The pressure plate assemblies 66 and 68 are slidably disposed on the clamp tubes 52 and are held against rotation by the clamp tubes. Thus, both the reaction disc assemblies 62 and pressure plate assemblies 66 and 68 are held against rotation relative to the base assembly 14 by the clamp tubes 52 and studs 50. However, the reaction disc assemblies 62 and pressure plate assemblies 66 and 68 are axially movable relative to the base assembly 14 along the clamp tubes 52.

Helical coil springs 72 extend around and are disposed in a coaxial relationship with the clamp tubes 52. The helical coil springs 72 urge the pressure plate assemblies 66 and 68 and reaction disc assemblies 62 to move axially away from the friction disc assemblies 32 when the force transmitting assembly 10 is in the disengaged condition.

A plurality of spring assemblies 76 are provided between the right end section 46 and the right pressure plate assembly 68. The spring assemblies 76 are disposed in an annular array having a central axis which is coincident with the central axis 28 of the force transmitting assembly 10. In the illustrated embodiment of the force transmitting assembly 10, there are 20 spring assemblies 76 disposed in an annular array between the right end section 46 and right pressure plate assembly 68. It should be understood that a greater or lesser number of spring assemblies 76 could be utilized if desired and that the foregoing specific number of spring assemblies has been set forth herein only for purposes of clarity of description.

The general construction and mode of operation of the force transmitting assembly 10 is well known. Thus, the force transmitting assembly 10 has a construction which is generally similar to disc-type water cooled brakes which are commercially available from Eaton Corporation, Airflex Division, of 9919 Clinton Road, Cleveland, Ohio 44144. Therefore, the general construction of the force transmitting assembly 10 will not be further described herein in order to avoid prolixity of description.

Right End Section

In accordance with a feature of the present invention, the right end section 46 (FIG. 2) of the force transmitting assembly 10 includes cylinder chambers 82 and 84. The cylinder chambers 82 and 84 enable the force transmitting assembly 10 to be operated between a plurality of engaged conditions in which the force transmitting assembly is operable to transmit forces of different magnitudes. The force transmitting assembly 10 is also operable to a disengaged condition in which the force transmitting assembly is ineffective to transmit force.

The spring assemblies 76 are effective to urge the force transmitting assembly 10 to a fully engaged condition in which the friction disc assemblies 32 are clamped between the reaction disc assemblies 62 and pressure plate assemblies 66 and 68 to hold the hub 18 against rotation relative to the base assembly 14. The force transmitting assembly 10 is operated from the fully engaged condition to a fully disengaged condition against the influence of the spring assemblies 76 by conducting fluid pressure to both of the cylinder chambers 82 and 84. By varying the fluid pressure conducted to the cylinder chamber 82 and/or the cylinder chamber 84, the magnitude of the force which the force transmitting assembly 10 is operable to transmit can be varied.

When both of the cylinder chambers 82 and 84 (FIGS. 2 and 3) are vented to low pressure, that is, ambient pressure, the force transmitting assembly 10 is engaged by the spring assemblies 76. At this time, the force transmitting assembly 10 has a maximum force transmitting capability. To reduce the force transmitting capability of the force transmitting assembly 10 by a relatively small amount, a low fluid pressure is conducted through the valve 88 to the relatively small cylinder chamber 84. At this time, the relatively large cylinder chamber 82 is vented to low pressure (atmosphere) through the valve 86.

To reduce the force transmitting capability of the force transmitting assembly 10 by a relatively large amount, fluid pressure is conducted through the valve 86 to the relatively large cylinder chamber 82. At this time, the cylinder chamber 84 is vented to low pressure (atmosphere). By varying the fluid pressures in the chambers 82 and 84 relative to each other, the magnitude of the force which the force transmitting assembly 10 is capable of transmitting can be varied through a large range of forces.

Since the cylinder chamber 82 is larger than the cylinder chamber 84, a relatively small change in the fluid pressure in the cylinder chamber 82 will effect a relatively large change in the force transmitting capability of the force transmitting assembly 10. Similarly, the same relatively small change in the fluid pressure in the small cylinder chamber 84 will effect a relatively small change in the force transmitting capability of the force transmitting assembly 10. By modulating the fluid pressure in the small cylinder chamber 84 with the control valve 88, it is relatively easy to accurately control the force transmitting capability of the force transmitting assembly 10.

During operation of the force transmitting assembly 10, the valves 86 and 88 may be operated to change the fluid pressure conducted to the cylinder chambers 82 and 84 in equal size increments. If this is the situation, an incremental change in the fluid pressure conducted to the cylinder chamber 82 will result in a change of a first magnitude in the force transmitting capability of the force transmitting assembly 10. The incremental change in the fluid pressure conducted to the cylinder chamber 84 will result in a change of a second magnitude in the force transmitting capability of the force transmitting assembly 10. The second magnitude of change in force transmitting capability will be smaller than the first magnitude of change in the force transmitting capability. The difference between the first and second magnitudes of change in force transmitting capability will be a function of the difference in the size of the cylinder chambers 82 and 84.

The base assembly 14 includes an annular spring housing or stationary section 90. The stationary section 90 is held against movement relative to the left or mounting end section 44 (FIG. 2) of the force transmitting assembly 10 by the studs 50 and clamp tubes 52. The locknuts 56 (FIG. 3) are effective to clamp the stationary section 90 firmly against the clamp tubes 52.

An annular array of cylindrical spring chambers 92 (FIGS. 2 and 3) is provided in the stationary section 90 of the base assembly 14. Each of the spring assemblies 76 is disposed in one of the spring chambers 92. The spring chambers 92 have central axes which extend parallel to the central axis 28 (FIG. 2) of the force transmitting assembly 10 and the central axis of the annular pressure plate 68.

The spring assemblies 76 apply force against the pressure plate assembly 68 to constantly urge the pressure plate assembly toward the left (as viewed in FIG. 2). When the cylinder chambers 82 and 84 are vented to low pressure, the force applied by the spring assemblies 76 against the pressure plate assembly 68 is relatively large. This spring force is effective to press the friction disc assemblies 32, reaction disc assemblies 62, and pressure plate assemblies 66 and 68 tightly together. The resulting friction force is sufficient to quickly stop rotation of the hub 18 and to hold the hub against rotation relative to the base assembly 14.

An annular axially outer or piston section 98 is axially movable relative to the stationary section 90 and left or mounting end section 44 (FIG. 2) of the force transmitting assembly 10. The piston section 98 is secured to the pressure plate assembly 68 by screws 102 and cylindrical spacer tubes 104. The screws 102 extend through the piston section 98 and the spacer tubes 104 into threaded openings in the pressure plate assembly 68. The spacer tubes 104 extend through radially outwardly opening recesses 106 in the stationary section 90 of the right end section 46 (FIGS. 1 and 2).

The piston section 98 is movable toward the right (as viewed in FIG. 2) away from the stationary section 90 to operate the force transmitting assembly 10 from the fully engaged condition through a range of partially engaged conditions to a disengaged condition. During rightward (as viewed in FIG. 2) movement of the piston section 98, the force transmitting capability of the force transmitting assembly 10 is reduced. As the piston section 98 move rightward, the screws 102 pull the pressure plate assembly 68 toward the right and compress the spring assemblies 76 against the stationary section 90. As the pressure plate assembly 68 is moved toward the right (as viewed in FIG. 2) the helical springs 72 move the reaction disc assemblies 62 toward the right and maintain equal spacing between the reaction disc assemblies.

An annular radially inner piston surface 112 (FIGS. 2 and 3) is formed on an annular piston section 114 of the movable section 98 of the base assembly 14. Similarly, an annular radially outer piston surface 118 is disposed on a piston section 120 of the stationary section 90 of the base assembly 14. The annular radially outer piston surface 118 has a larger area than and is coaxial with the annular radially inner piston surface 112.

Figure 3:
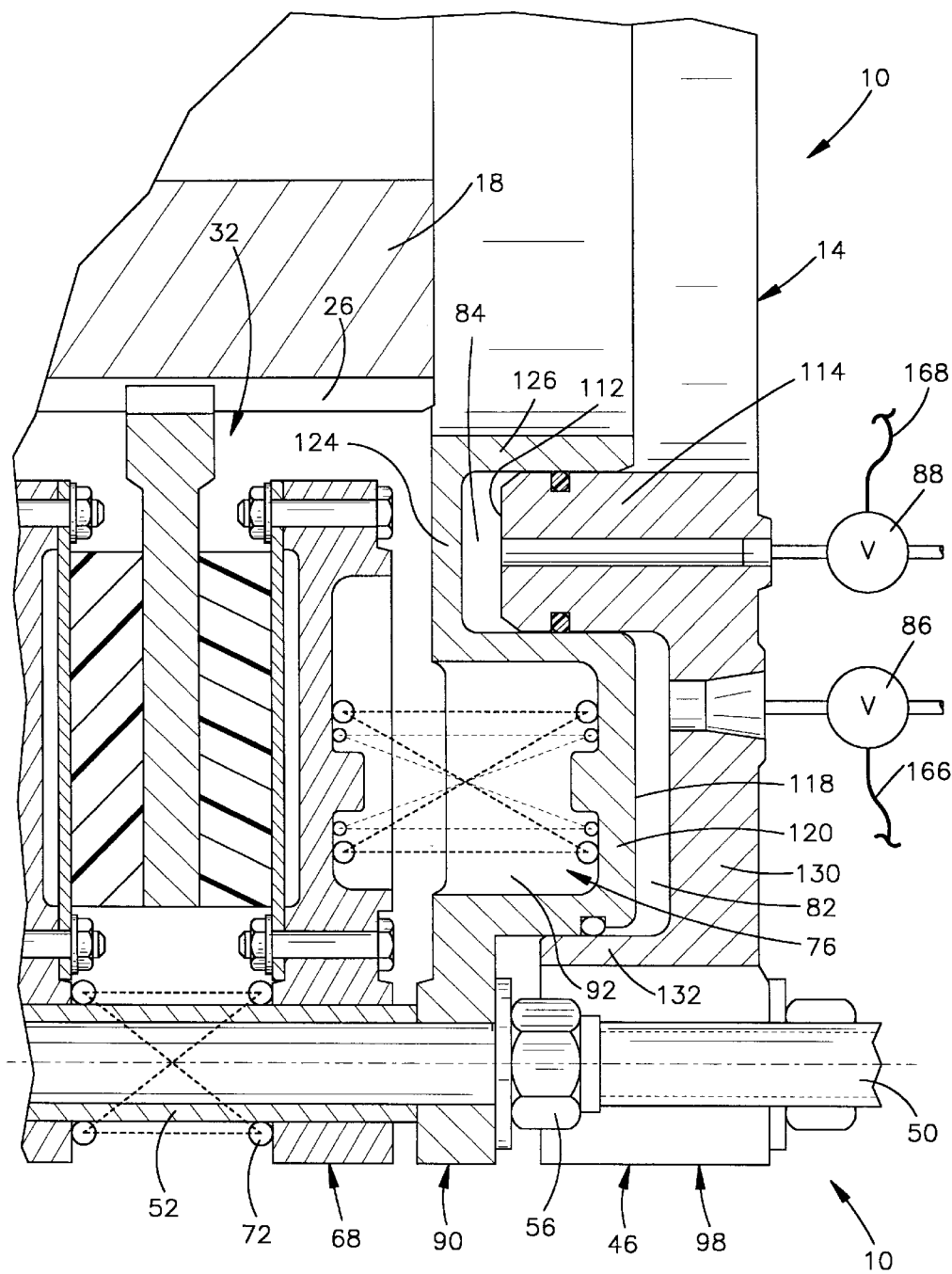
FIG. 3 is an enlarged fragmentary sectional view of a portion of FIG. 2.

The stationary section 90 cooperates with the piston section 114 of the movable section 98 of the base assembly 14 to form the cylinder chamber 84 (FIG. 3). Thus, the stationary section 90 of the base assembly 14 includes a radially inwardly extending annular side wall 124 which is integrally formed as one piece with the piston section 120 and extends radially inward from the piston section. A cylindrical axially extending side wall 126 is integrally formed as one piece with the side wall 124 and piston section 120 and extends axially outward, that is toward the right as viewed in FIG. 3, from the side wall 124. The piston section 114 of the movable section 98 is enclosed by the piston section 120 and side walls 124 and 126 of the stationary section 90 to form the annular cylinder chamber 84.

The movable section 98 of the base assembly 14 includes an annular radially outwardly extending side wall 130 (FIG. 3) which is integrally formed as one piece with the piston section 114. A cylindrical axially inwardly extending sidewall 132 is integrally formed as one piece with the sidewall 130 and piston section 114 of the movable section 98. The piston section 114, radially extending side wall 130 and axially extending side wall 132 of the movable section 98 enclose the piston section 120 of the stationary section 88 to form the annular cylinder chamber 82.

Left End Section

Figure 4:
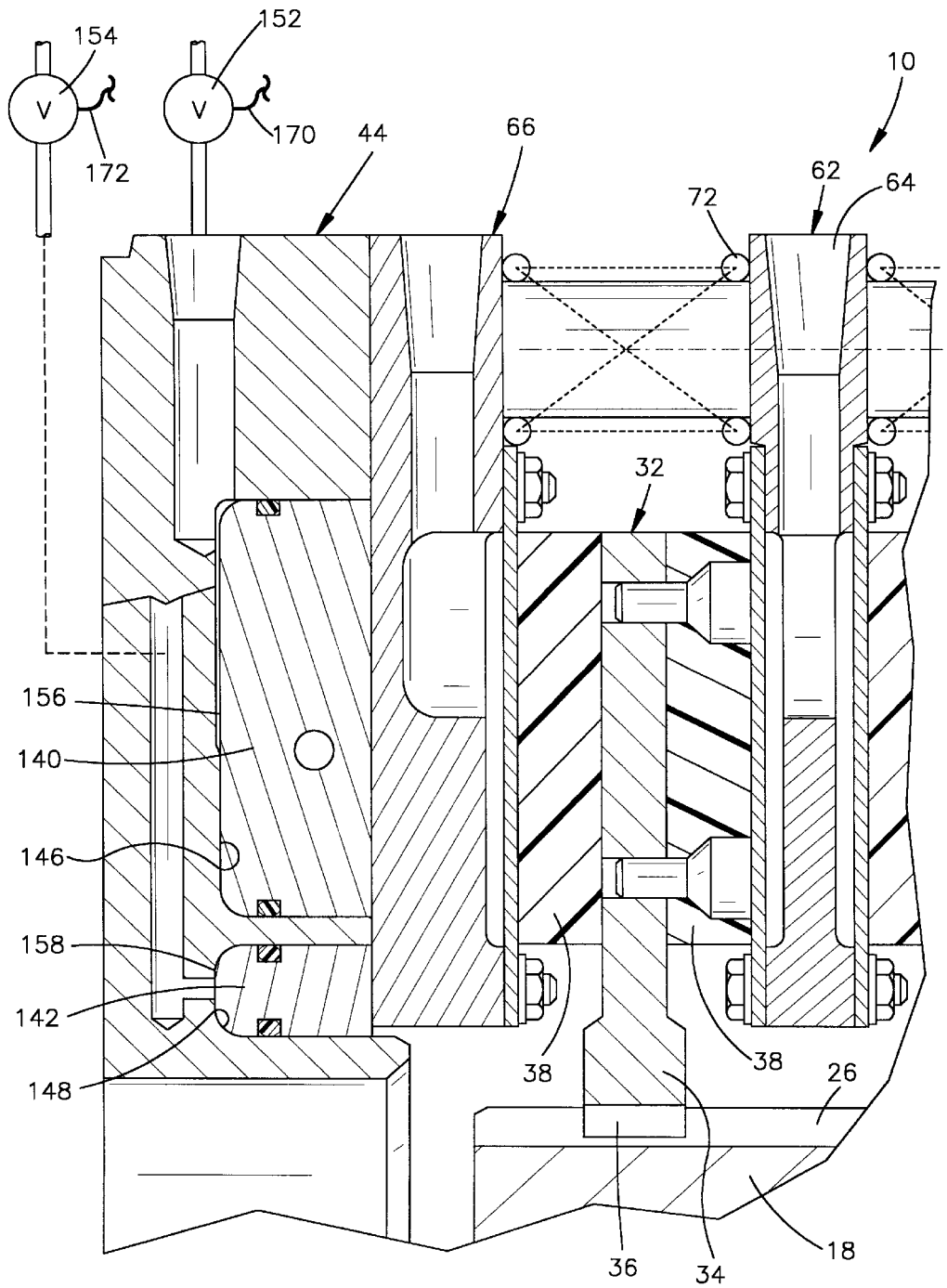
FIG. 4 is an enlarged fragmentary sectional view of another portion of FIG. 2.

The left end section 44 (FIG. 2) includes an annular radially outer piston 140 and an annular radially inner piston 142. The outer piston 140 (FIG. 4) is disposed in an annular cylinder chamber 146 formed in the left end section 44. The inner piston 142 is disposed in an annular cylinder chamber 148 formed in the left end section 44. The annular pistons 140 and 142 are disposed in a coaxial relationship with each other and with the pressure plate assembly 66.

Operation of a three-way control valve 152 (FIG. 4) is effective to modulate fluid pressure conducted to the cylinder chamber 146 to press the outer piston 140 against the pressure plate assembly 66. Similarly, operation of a three-way control valve 154 is effective to modulate fluid pressure conducted to the cylinder chamber 148 to press the inner piston 142 against the pressure plate assembly 66. The control valves 152 and 154 are operable to one actuated condition to conduct fluid pressure to the cylinder chambers 146 and 148. The control valves 152 and 154 are operable to another actuated condition to vent the cylinder chambers 146 and 148 to low pressure, that is, to atmosphere. When the cylinder chambers 146 and 148 are vented, the pistons 140 and 142 are ineffective to press against the pressure plate assembly 66.

The piston 140 has a relatively large annular surface area 156 which is exposed to fluid pressure conducted from the control valve 152. The piston 142 has a relatively small annular surface area 158 which is exposed to fluid pressure upon operation of the control valve 154. By operating the control valves 152 and 154, the fluid pressure applied against the pistons 140 and 142 can be varied to thereby vary the force applied against the pressure plate assembly 66.

By varying the force applied against the pressure plate assembly 66, the magnitude of the force which is transmitted by the force transmitting assembly 10 can be controlled. Since the annular surface area 156 on the piston 140 is relatively large, compared to the annular surface area 158 on the piston 142, a relatively small change in the fluid pressure conducted through the control valve 152 to the cylinder chamber 146 is effective to make a relatively large change in the force applied against the pressure plate assembly 66 by the outer piston 140. The relatively small surface area 158 on the inner piston 142 requires a relatively large change in the fluid pressure applied against the surface area to effect a relatively small change in the force applied against the pressure plate assembly 66 by the inner piston 142.

It is contemplated that it may be desired to use the valves 86 and 88 (FIG. 2) to control a flow of hydraulic fluid to the right (as viewed in FIG. 2) cylinder chambers 82 and 84. The valves 152 and 154 may be used to control a flow of air to the left (as viewed in FIG. 2) cylinder chambers 156 and 158. Of course, a different arrangement could be utilized if desired. For example, hydraulic fluid could be conducted to all of the cylinder chambers 82, 84, 156 and 158.

The radially outer piston 140 and the radially inner piston 142 may be omitted if desired. If this is done, the force transmitting capability of the force transmitting assembly 10 would be varied by varying the fluid pressure conducted to the cylinder chambers 82 and 84. Since the cylinder chamber 84 has a relatively small piston area 112, the force transmitting capability of the force transmitting assembly 10 can be accurately varied with incremental changes in the fluid pressure conducted to the cylinder chamber 84. Due to the larger piston area 118 in the cylinder chamber 82, the same incremental changes in fluid pressure conducted to the piston chamber 82 will result in a larger change in the force transmitting capability of the force transmitting assembly 10.

Operation

A controller 164 is connected with the control valves 86, 88, 152 and 154 by leads 166, 168, 170 and 172 (FIG. 2). The controller 164 is effective to control the operation of the valves 86, 88, 152 and 154. The valves 86 and 88, are operable to effect operation of the force transmitting assembly 10 between the engaged and disengaged conditions. The valves 152 and 154 are operable to vary the magnitude of the force which is transmitted through the force transmitting assembly 10 when the cylinder chambers 82 and 84 have been connected with a source of fluid (hydraulic) pressure through the valves 86 and 88.

When the force transmitting assembly 10 is in the fully engaged or locked-up condition, the hub 18 is held against rotation relative to the base assembly 14. At this time, the cylinder chambers 82 and 84 in the right end section 46 are vented to ambient pressure through the valves 86 and 88. Therefore, the spring assembly 76 is effective to press the pressure plate assembly 68 toward the stationary left end section 44 with a maximum amount of force. This force is effective to firmly clamp the friction disc assemblies 32 between the reaction disc assemblies 62 and the pressure plate assemblies 66 and 68.

If desired, the controller 164 could effect operation of the valves 152 and 154 to an open condition. This would increase the pressure in the cylinder chambers 146 and 148 to press the pistons 140 and 142 toward the pressure plate assembly 66. However, it is believed that it may be preferred to utilize the pistons 140 and 142 in the left end section 44 to modulate the force which is transmitted through the force transmitting assembly 10 when the force assembly is in a condition other than a fully engaged condition.

When the force transmitting assembly 10 is to be operated to an engaged condition in which a relatively large force is to be transmitted through the force transmitting assembly, the control valve 88 is operated to transmit fluid pressure to the cylinder chamber 84. This fluid pressure is applied against the relatively small piston surface 112 (FIGS. 2 and 3) on the movable section 98 of the right end section 46. This fluid pressure is effective to urge the pressure plate assembly 68 toward the right, against the influence of the spring assemblies 76, to reduce the force transmitting capability of the force transmitting assembly 10.

Since the inner piston surface area 112 is relatively small, the fluid pressure conducted to the cylinder chamber 84 effects a relatively small reduction in the force transmitting capability of the force transmitting assembly 10. Therefore, a relatively large load would have to be applied to the hub 18 to cause slippage of the friction disc assemblies 32 relative to the reaction disc assemblies 62 and pressure plate assemblies 66 and 68.

When a substantial reduction in the force transmitting capability of the force transmitting assembly 10 is desired, the controller 164 effects operation of the valve 86 to transmit fluid pressure to the cylinder chamber 82. At this time, the cylinder chamber 84 may be vented to ambient pressure. This results in the application of fluid pressure against only the relatively large piston surface area 118.

The fluid pressure in the cylinder chamber 82 causes the movable section 98 of the base assembly 14 to urge the pressure plate assembly 68 toward the right (as viewed in FIG. 2) with a relatively large force. This force is effective to compress the spring assemblies 76. The fluid pressure force is effective to cause a relatively large reduction in the force transmitting capability of the force transmitting assembly 10.

The extent to which the force transmitting capability of the force transmitting assembly 10 is reduced can be modulated by operation of the valve 88 to control the fluid pressure applied against the piston 114. Thus, if a decrease in the force transmitting capability of the force transmitting assembly 10 is desired, the valve 88 is operated to apply fluid pressure against a relatively small area 112 on the inner piston 114. By operating the valve to control the fluid pressure applied against the piston 114 the magnitude of the reduction in the force transmitting capability of the force transmitting assembly 10 can be controlled.

When the force transmitting assembly 10 is to be operated to the fully disengaged condition, the controller 164 effects operation of both the valve 86 and the valve 88 (FIG. 2) to direct fluid pressure to the cylinder chambers 82 and 84. This causes the movable section 98 of the right end section 46 of the base assembly 14 to be moved toward the right (as viewed in FIG. 2) with a maximum force to compress the spring assemblies 76. When this occurs, the helical spring 72 shifts the reaction disc assemblies 62 along the studs 50 and clamp tubes 52 so that there is a slight clearance space between the friction disc assemblies 32 and the reaction disc assemblies 62 and pressure plate assemblies 66 and 68.

If it is desired to transmit only a very small amount of force through the force transmitting assembly 10 rather than to operate the force transmitting assembly to a fully disengaged condition, the valves 152 and/or 154 can be operated to apply fluid pressure against the pistons 140 and/or 142 to thereby press the pressure plate assembly 66 against the adjacent friction disc assembly 32. It is contemplated that it may be desired to have relatively large increases in the force transmitting capability of the force transmitting assembly 10 effected by operation of the valve 152 to vary the fluid pressure in the large cylinder chamber 156. Relatively small increases in the force transmitting capability of the force transmitting assembly 10 can be effected by operating the valve 154 to vary the fluid pressure in the small piston chamber 158.

The piston 142 has a much smaller surface area than the piston 140. Therefore, an incremental increase in the fluid pressure transmitted through the valve 152 to the cylinder chamber 156 will effect a greater increase in the force transmitting capability of the force transmitting assembly 10 than the same incremental increase in the fluid pressure conducted through the valve 154 to the cylinder chamber 158. Therefore, small changes in the force transmitting capability of the force transmitting assembly 10 are effected by varying the fluid pressure in the cylinder chamber 158.

Second Embodiment

Figure 5:
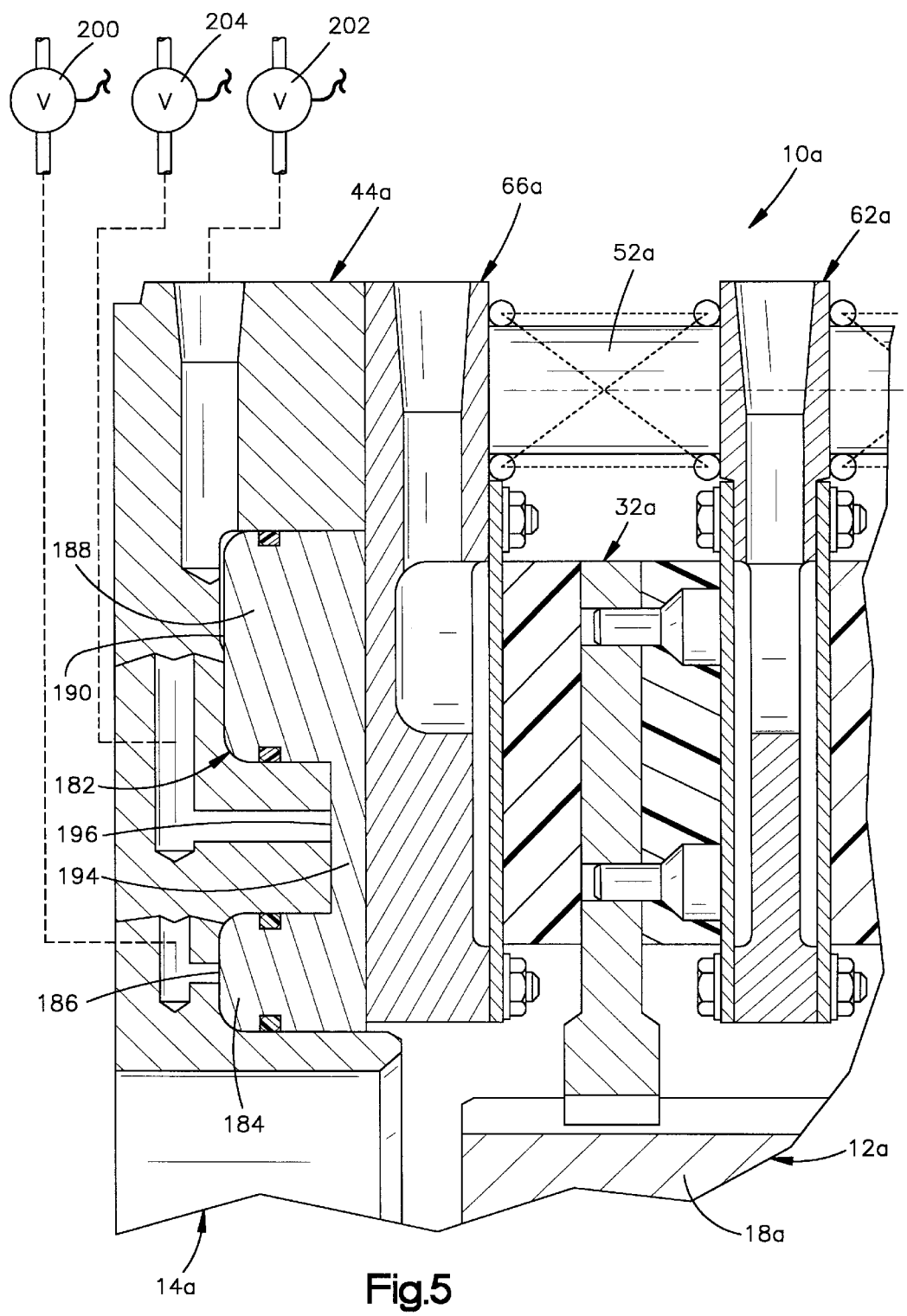
FIG. 5 is an enlarged fragmentary sectional view, generally similar to FIG. 4, of a portion of a second embodiment of the force transmitting assembly.

In the embodiment of the invention illustrated in FIGS. 1–4, separate pistons 140 and 142 (FIGS. 2 and 4) are provided in the left end section 44 of the base assembly 14 to modulate the force transmitting capability of the force transmitting assembly 10. In the embodiment of the invention illustrated in FIG. 5, a single piston is utilized. Since the embodiment of the invention illustrated in FIG. 5 is generally similar to the embodiment of the invention illustrated in FIGS. 1–4, similar numerals will be utilized to designate similar components, the suffix letter "a" being associated with the numerals of FIG. 5 in order to avoid confusion.

A force transmitting assembly 10a includes a rotor assembly 12a which is rotatable relative to a base assembly 14a. The base assembly 14a includes a left or mounting end section 44a. The rotor assembly 12a includes a hub 18a which is connected with a plurality of friction disc assemblies 32a. The friction disc assembly 32a is disposed between a reaction disc assembly 62a and a pressure plate assembly 66a. The reaction disc assembly 62a and pressure plate assembly 66a are slidably mounted on a clamp tube 52a.

In accordance with a feature of this embodiment of the invention, an annular piston 182 is provided in the end section 44a to modulate the force transmitting capability of the force transmitting assembly 10a. The piston 182 includes a relatively small annular radially inner piston section 184. The piston section 184 has a relatively small annular piston area 186 against which fluid pressure is applied. The piston 182 includes a relatively large annular radially outer piston section 188 having a relatively large annular piston area 190. An annular intermediate piston section 194 has an annular piston area 196. The piston area 196 is larger than and coaxial with the piston area 186 on the piston section 184 and is smaller than and coaxial with the piston area 190 on the piston section 188.

A plurality of control valves 200, 202, and 204 are provided to control the fluid pressure applied against the piston areas 186, 190 and 196. Thus, the valve 200 is operable to vary the fluid pressure applied against the piston area 186 on the piston section 84. The valve 202 is operable to vary the fluid pressure applied against the piston area 190 on the piston section 188. The valve 204 is operable to vary the fluid pressure applied against the piston area 196 on the piston section 194.

During operation of the force transmitting assembly 10a, the valves 200–204 are operated to vary the fluid pressure applied against the piston surface areas 186, 190 and 196. By varying the fluid pressure applied against the piston surface areas 186, 190 and 196, the force transmitting capability of the force transmitting assembly 10a can be modulated. Although only the left or mounting end section 44a of the force transmitting assembly 10a is illustrated in FIG. 5, it should be understood that the force transmitting assembly 10a has the same general construction as the force transmitting assembly 10 and includes a right end section having the same construction as the right end section 46 of the force transmitting assembly 10.

Third Embodiment

Figure 6:
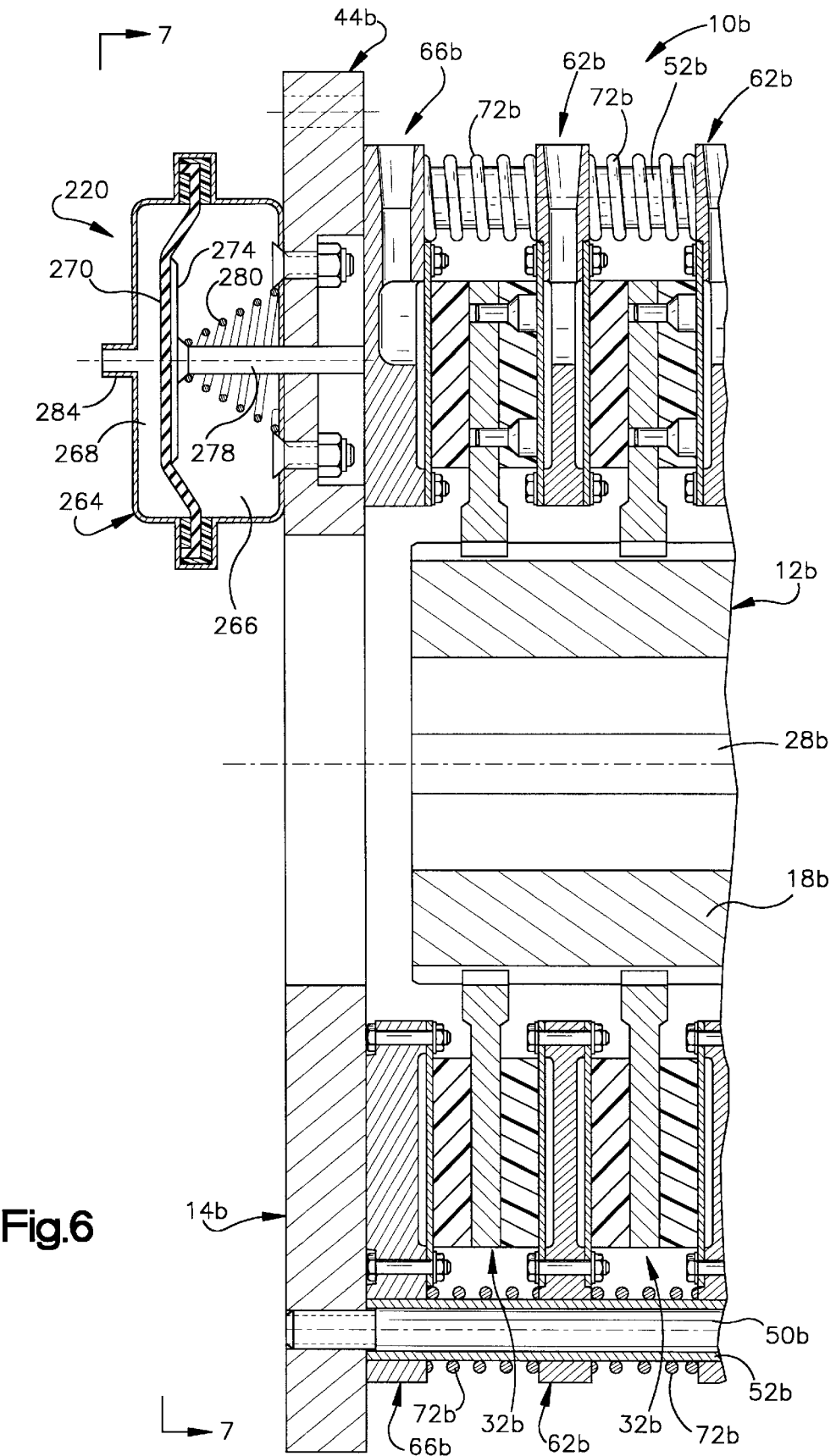
FIG. 6 is a fragmentary sectional view, generally similar to FIG. 2, of a portion of a third embodiment of the force transmitting assembly.
Figure 7:
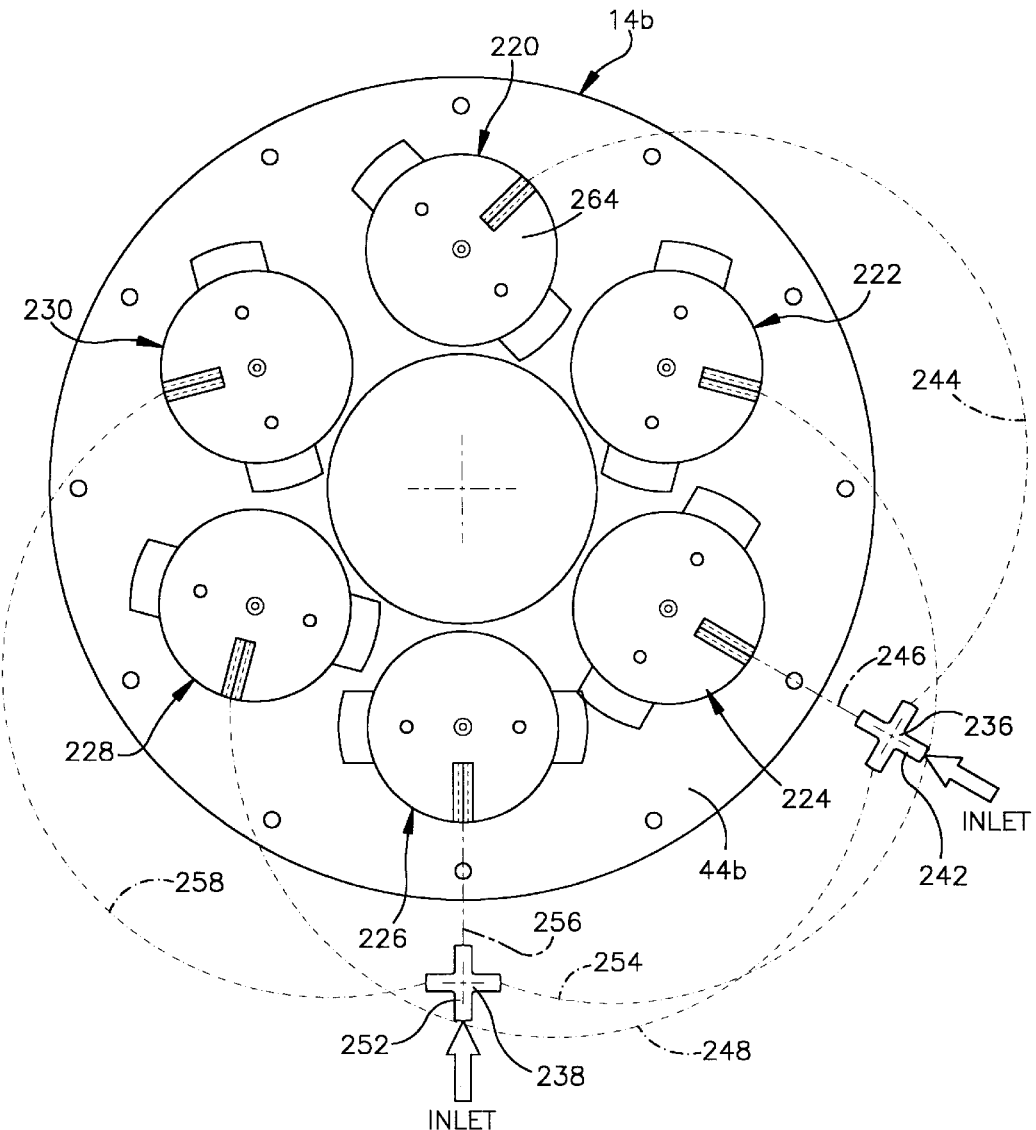
FIG. 7 is an end view, taken generally along the line 7—7 of FIG. 6, further illustrating the construction of the third embodiment of the invention.

In the embodiment of the invention illustrated in FIGS. 1–5, pistons 140 and 142 or 182 are disposed in the left or mounting end sections 44 or 44a. In the embodiment of the invention illustrated in FIGS. 6 and 7, a plurality of separate piston assemblies are connected with the left or mounting end section. Since the embodiment of the invention illustrated in FIGS. 6 and 7 is generally similar to the embodiment of the invention illustrated in FIGS. 1–5, similar numerals will be utilized to designate similar components, the suffix letter "b" being associated with the numerals of FIGS. 6 and 7 in order to avoid confusion.

A force transmitting assembly 10b (FIG. 6) includes a rotor assembly 12b which is rotatable relative to a base assembly 14b. The base assembly 14b includes an annular left or mounting end section 44b. The rotor assembly 12b includes a hub 18b which is connected with a plurality of annular friction disc assemblies 32b. The rotor assembly 12b is rotatable about a longitudinal central axis 28b of the force transmitting assembly 10b.

An annular left (as viewed in FIG. 6) friction disc assembly 32b is disposed between an annular pressure plate assembly 66b and an annular reaction disc assembly 62b. The reaction disc assembly 62b and the pressure plate assembly 66b are mounted on cylindrical clamp tubes 52b. Studs 50b extend through the cylindrical clamp tubes 52b and are connected with the left end section 44b of the base assembly 14b. Helical coil springs 72b extend around and are disposed in a coaxial relationship with the clamp tubes 52b.

In accordance with a feature of this embodiment of the invention, a plurality of piston assemblies 220, 224, 226, 228 and 230 (FIG. 7) are mounted on the left or mounting end section 44b. The piston assemblies 220–230 all have the same construction. The piston assemblies 220–230 are operable to modulate the force transmitting capability of the force transmitting assembly 10b.

Control valves 236 and 238 have been indicated schematically in FIG. 7 and are operable to control the operation of the piston assemblies 220–230. Specifically, the control valve 236 is operable to direct fluid pressure from an inlet 242 to the piston assemblies 220, 224 and 228 through conduits indicated schematically at 244, 246 and 248 in FIG. 7. Similarly, the control valve 238 has an inlet 252 from which fluid pressure is directed through conduits 254, 256 and 258 to the piston assemblies 222, 226, and 230.

Operation of the three-way control valve 236 is effective to modulate fluid pressure conducted to the piston assemblies 220, 224 and 228. This modulates the force with which the pressure plate assembly 66b is pressed against the friction disc assembly 32b (FIG. 6) by the piston assemblies 220, 224 and 228 (FIG. 7).

Similarly, operation of the three-way control valve 238 is effective to modulate fluid pressure conducted to the piston assemblies 222, 226 and 230. This modulates the force with which the pressure plate assembly 66b (FIG. 6) is pressed against the friction disc assembly 32b by the piston assemblies 222, 226 and 230 (FIG. 7).

The control valves 236 and 238 may be simultaneously actuated to effect operation of all of the piston assemblies 220–230. If desired, only the control valve 236 could be actuated to effect operation of the piston assemblies 220, 224 and 228. Similarly, only the control valve 238 could be actuated to effect operation of the piston assemblies 222, 226 and 230. The control valves 236 and 238 are operable to vent the piston assemblies 220–230 to minimize the force which is applied against the pressure plate assembly 66b by the piston assemblies.

When the force applied against the pressure plate assembly 66b is to be increased by a relatively small amount, only one of the control valves 236 or 238 is actuated. For example, actuation of the control valve 236 effects operation of only the piston assemblies 220, 224 and 228 to apply force against the pressure plate assembly 66b. When a relatively large force is to be applied against the pressure plate assembly 66b by the piston assemblies 220–230, both of the control valves 236 and 238 are operated to direct fluid pressure to all of the piston assemblies.

By varying the force which is applied against the pressure plate assembly 66b by the piston assemblies 220–230, the magnitude of the force which is transmitted by the force transmitting assembly 10b can be controlled. In the illustrated embodiment of the invention, the piston assemblies 220–230 are operated under the influence of fluid pressure, specifically air pressure. However, if desired, the piston assemblies 220–230 could be constructed in such as a manner as to be actuated by hydraulic fluid.

The piston assembly 220 (FIG. 6) includes a generally cylindrical housing 264. The housing 264 is divided into a spring chamber 266 and a pressure chamber 268 by a flexible polymeric diaphragm 270.

A circular piston 274 is connected with the diaphragm 270. A cylindrical piston rod 278 is fixedly connected with the piston 274. The piston rod 278 is slidable in a cylindrical opening in the mounting end section 44b. The piston rod 278 engages the pressure plate assembly 66b. A spiral spring 280 urges the piston 274 and diaphragm 270 toward the left (as viewed in FIG. 6).

When the piston assembly 220 is to be operated to apply force against the pressure plate assembly 66b to urge the pressure plate assembly toward the friction disc assembly 32b, fluid (air) pressure is conducted through the inlet 284 to the pressure chamber 268. The pressure in the chamber 268 urges the diaphragm 270 and piston 274 toward the right (as viewed in FIG. 6). This results in the transmission of force from the piston 274 through the piston rod 278 to the pressure plate assembly 66b. When the force applied against the pressure plate assembly 66b is to be reduced, the inlet 284 to the pressure chamber 268 is vented to atmosphere.

The piston assemblies 222 through 230 have the same construction and mode of operation as the piston assembly 220. The piston assemblies 220–230 (FIG. 7) are disposed in a circular array. The circular array of piston assemblies 220–230 has a central axis which is coincident with the longitudinal central axis 28b of the force transmitting assembly 10b.

Each of the piston assemblies 220–230 has a central axis which is coincident with a central axis of the piston rod 278. The central axes of the piston assemblies 220–230 extend parallel to the longitudinal central axis 28b of the force transmitting assembly 10b. The central axes of the piston assemblies 220–230 are offset by the same distance from the longitudinal central axis 28b of the force transmitting assembly 10b.

The piston assemblies 220–230 form modular units which are mounted in a circular array on a side of the mounting end section 44b opposite from the pressure plate assembly 66b. Since the piston assemblies 220 are formed as separate modular units, they can be manufactured separately from the mounting end section 44b and connected with the mounting end section during construction of the force transmitting assembly 10b.

In the illustrated embodiment of the invention, the piston assemblies 220 were obtained from MGM Brake Division of Indian Head Industries of Charlotte, N.C. under the designation of Part No. 143001 or 1436001. It should be understood that the foregoing specific source of piston assemblies 220–230 having one specific construction has been set forth herein for purposes of clarity of description. It is contemplated that the piston assemblies 220–230 could have any one of many different constructions and could be obtained from any one of many different sources.

In the embodiment of the invention illustrated in FIG. 6, the right end of the force transmitting assembly 10b (not shown) has the same construction as the right end of the force transmitting assembly 10 of FIG. 2. However, it is contemplated that the right end of the force transmitting assembly 10b could have a different construction if desired. For example, the right end of the force transmitting assembly 10b could have a construction similar to that disclosed in U.S. Pat. No. 4,609,076. It is also contemplated that piston assemblies, similar to the piston assemblies 220–230, could be associated with the right end of the force transmitting assembly 10b in order to further modulate the force transmitting capability of the force transmitting assembly 10b.

Conclusion

The present invention provides a new and improved force transmitting assembly 10 which is operable between a plurality of engaged conditions and a disengaged condition. The force transmitting assembly 10 includes first and second piston areas 112 and 118. Fluid pressure is applied against the first piston area 112 to effect transmission of force of a first magnitude. Fluid pressure is applied against the second piston area 118 to effect the transmission of force of a second magnitude. The first and second piston areas 112 and 118 are disposed in one axial end portion 46 of the force transmitting assembly 10.

In addition, the force transmitting assembly 10 may include third and fourth piston areas 156 and 158 against which fluid pressure is applied to vary the magnitude of the force transmitted by the force transmitting assembly 10. The third and fourth piston areas 156 and 158 are disposed in an axial end portion 44 of the force transmitting assembly 10 opposite from the end portion in which the first and second piston areas are disposed.

Having described the invention, the following is claimed:

1. A force transmitting assembly operable between a plurality of engaged conditions in which said force transmitting assembly is operable to transmit forces of different magnitudes and a disengaged condition in which said force transmitting assembly is ineffective to transmit force, said force transmitting assembly comprising a first member, a circular force transmitting disc connected with said first member, a second member, a circular reaction disc connected with said second member, said first member and said force transmitting disc being rotatable relative to said second member and said reaction disc when said force transmitting assembly is in the disengaged condition, and actuator means for operating said force transmitting assembly between the disengaged condition and the plurality of engaged conditions, said actuator means including a first piston area against which fluid pressure is applied when said force transmitting assembly is in a first engaged condition in which said force transmitting assembly is effective to transmit force of a first magnitude and a second piston area against which fluid pressure is applied when said force transmitting assembly is in a second engaged condition in which said force transmitting assembly is effective to transmit force of a second magnitude, said first and second piston areas being disposed in a first axial end portion of said force transmitting assembly at a location which is axially offset to a first side of said reaction and force transmitting discs.

2. A force transmitting assembly as set forth in claim 1 wherein said actuator means includes a third piston area against which fluid pressure is applied when said force transmitting assembly is in at least one of said first and second engaged conditions, said third piston area being disposed in a second axial end portion of said force transmitting assembly at a location axially offset to a second side of said reaction and force transmitting discs.

3. A force transmitting assembly as set forth in claim 1 wherein said actuator means includes a third piston area against which fluid pressure is applied when said force transmitting assembly is in a third engaged condition, said third piston area being disposed in said first axial end portion of said force transmitting assembly.

4. A force transmitting assembly as set forth in claim 1 further including spring means for urging said force transmitting assembly toward the engaged condition, said spring means being disposed in the first axial end portion of said force transmitting assembly, said first and second piston areas being vented to a relatively low fluid pressure when said force transmitting assembly is in a third engaged condition in which said force transmitting assembly is effective to transmit force of a third magnitude which is greater than the force of a first magnitude and is greater than the force of a second magnitude.

5. A force transmitting assembly as set forth in claim 1 further including spring means for urging said force transmitting assembly toward the engaged condition, said spring means being disposed in a second axial end portion of said force transmitting assembly at a location offset to a second side of said reaction and force transmitting discs, said actuator means including a third piston area against which fluid pressure is applied to reduce the force with which said spring means urges said force transmitting assembly toward the engaged condition and a fourth piston area against which fluid pressure is applied to reduce the force with which said spring means urges said force transmitting assembly toward the engaged condition, said third and fourth piston areas being disposed in the second axial end portion of said force transmitting assembly.

6. A force transmitting assembly as set forth in claim 1 further including spring means for urging said force transmitting assembly toward the engaged condition, a first annular member which is engaged by said spring means, said first annular member being disposed in a coaxial relationship with said circular force transmitting disc and with said circular reaction disc, said first annular member having an annular piston section and an annular cylinder section, a second annular member disposed in a coaxial relationship with said first annular member, said second annular member having an annular piston section which is at least partially enclosed by said annular cylinder section of said first annular member, said second annular member having an annular cylinder section which at least partially encloses said annular piston section of said first annular member, said first piston area being disposed on said annular piston section of said first annular member and said second piston area being disposed on said annular piston section of said second annular member.

7. A force transmitting assembly as set forth in claim 6 wherein said first piston area has an annular configuration, said second piston area has an annular configuration, said first piston area being coaxial with and disposed radially outward of said second piston area.

8. A force transmitting assembly as set forth in claim 7 wherein said first piston area is larger than said second piston area.

9. A force transmitting assembly as set forth in claim 1 further including an end section axially offset to the first side of said reaction and force transmitting discs and connected with said reaction discs, said end section including first surface means for defining a first annular recess and a second surface means for defining a second annular recess, said first and second annular recesses being disposed in a coaxial relationship with said circular force transmitting disc and with said circular reaction disc, a first annular piston disposed in said first annular recess and a second annular piston disposed in said second annular recess, said first piston area being disposed on said first annular piston and said second piston area being disposed on said second annular piston.

10. A force transmitting assembly as set forth in claim 9 wherein said first piston area has an annular configuration, said second piston area has an annular configuration, said first piston area being coaxial with and disposed radially outward of said second piston area.

11. A force transmitting assembly as set forth in claim 10 wherein said first piston area is larger than said second piston area.

12. A force transmitting assembly as set forth in claim 9 further including spring means for urging said force transmitting assembly toward the engaged condition, a first annular member which is engaged by said spring means, said first annular member and said spring means being axially offset to a second side of said reaction and force transmitting discs, said first annular member being disposed in a coaxial relationship with said circular force transmitting disc and with said circular reaction disc, a second annular member disposed in a coaxial relationship with said first annular member, said first and second annular members having an annular piston section and an annular cylinder section which at least partially encloses said annular piston section, said annular piston section including a third piston area which is disposed in a coaxial relationship with said first and second piston areas.

13. A force transmitting assembly as set forth in claim 1 further including an end section axially offset to the first side of said reaction and force transmitting discs and connected with said reaction discs, said end section including surface means for defining an annular recess, said annular recess being disposed in a coaxial relationship with said circular force transmitting disc and with said circular reaction disc, a first annular piston disposed in said annular recess, said first and second piston areas being disposed on said first annular piston, said first piston area having an annular configuration and being disposed on a first portion of aid first annular piston, said second piston area having an annular configuration and being disposed on a second portion of said first annular piston, said first piston area being disposed radially outward of said second piston area.

14. A force transmitting assembly as set forth in claim 13 further including a third piston area disposed on said first annular piston, said third piston area having an annular configuration and being disposed on a third portion of said first annular piston, said third piston area being disposed radially outward of said second piston area and being disposed radially inward of said first piston area.

15. A force transmitting assembly as set forth in claim 13 further including spring means for urging said force transmitting assembly toward the engaged condition, a first annular member which is engaged by said spring means, said first annular member and said spring means being axially offset to a second side of said reaction and force transmitting discs, said first annular member being disposed in a coaxial relationship with said circular force transmitting disc and with said circular force transmitting disc and with said circular reaction disc, a second annular member disposed in a coaxial relationship with said first annular member, said first and second annular members having an annular piston section and an annular cylinder section which at least partially encloses said annular piston section, said annular piston section including a third piston area which is disposed in a coaxial relationship with said first and second areas.

16. A force transmitting assembly operable between a plurality of engaged conditions in which said force transmitting assembly is operable to transmit forces of different magnitudes and a disengaged condition in which said force transmitting assembly is ineffective to transmit force, said force transmitting assembly comprising a first member, a circular force transmitting disc connected with said first member, a second member, a circular reaction disc connected with said second member, said first member and said force transmitting disc being rotatable relative to said second member and said reaction disc when said force transmitting assembly is in the disengaged condition, and actuator means for operating said force transmitting assembly between the disengaged condition and the plurality of engaged conditions by effecting axial movement between reaction and force transmitting discs, said actuator means including first piston means having a first annular piston area against which fluid pressure is applied when said force transmitting assembly is in a first engaged condition in which said force transmitting assembly is effective to transmit force of a first magnitude, a second annular piston area against which fluid pressure is applied when said force transmitting assembly is in a second engaged condition in which said force transmitting assembly is effective to transmit force of a second magnitude, said first annular piston area being disposed radially outward of said second annular piston area, said first piston means being disposed in a first axial end portion of said force transmitting assembly at a location which is axially offset to first side of said reaction and force transmitting discs, second piston means having a third annular piston area against which fluid pressure is applied when said force transmitting assembly is in a third engaged condition in which said force transmitting assembly is effective to transmit force of a third magnitude, a fourth annular piston area against which fluid pressure is applied when said force transmitting assembly is in a fourth engaged condition in which said force transmitting assembly is effective to transmit force of a fourth magnitude, said third annular piston area being disposed radially outward of fourth annular piston area, said second piston means being disposed in a second axial end portion of said force transmitting assembly at a location which is axially offset to second side of said reaction and force transmitting discs.

17. A force transmitting assembly as set forth in claim 16 further including spring means for urging said force transmitting assembly toward the engaged condition, said force transmitting assembly being operable from the engaged condition to the disengaged condition against the influence of said spring means under the combined influence of fluid pressure against said first and second annular piston areas.

18. A force transmitting assembly operable between a plurality of engaged conditions in which said force transmitting assembly is operable to transmit forces of different magnitudes and a disengaged condition in which said force transmitting assembly is ineffective to transmit force, said force transmitting assembly comprising a first member, a circular force transmitting disc connected with said first member, a second member, a circular reaction disc connected with said second member, said first member and said force transmitting disc being rotatable relative to said second member and said reaction disc when said force transmitting assembly is in the disengaged condition, and actuator means for operating said force transmitting assembly between the disengaged condition and the plurality of engaged conditions, said actuator means includes a plurality of pistons having central axes offset from and extending parallel to an axis about which said first member and said force transmitting disc are rotatable, each of said pistons of said plurality of pistons is movable relative to said second member to press said reaction disc against said force transmitting disc.

19. A force transmitting assembly as set forth in claim 18 wherein said plurality of pistons are disposed in a circular array having a center of curvature disposed on the axis about which said first member and force transmitting disc are rotatable.

20. A force transmitting assembly as set forth in claim 18 wherein said circular reaction disc is disposed adjacent to a first side of said second member and said plurality of pistons are disposed adjacent to a second side of said second member.

21. A force transmitting assembly as set forth in claim 18 wherein said actuator means includes a plurality of piston rods, each of said piston rods being connected with one of said pistons and extending through said second member into engagement with said reaction disc.

22. A force transmitting assembly as set forth in claim 18 wherein said actuator means includes a plurality of housings connected with said second member, each of said pistons of said plurality of pistons being disposed in one of said housings of said plurality of housings.

23. A force transmitting assembly operable between a plurality of engaged conditions in which said force transmitting assembly is operable to transmit forces of different magnitudes and a disengaged condition in which said force transmitting assembly is ineffective to transmit force, said force transmitting assembly comprising a first member, a circular force transmitting disc connected with said first member, a second member, a circular reaction disc connected with said second member, said first member and said force transmitting disc being rotatable relative to said second member and said reaction disc when said force transmitting assembly is in the disengaged condition, and actuator means for operating said force transmitting assembly between the disengaged condition and the plurality of engaged conditions, said actuator means includes a plurality of pistons having central axes offset from and extending parallel to an axis about which said first member and said force transmitting disc are rotatable, said plurality of pistons are disposed in a circular array having a center of curvature disposed on the axis about which said first member and force transmitting disc are rotatable.

24. A force transmitting assembly as set forth in claim 23 wherein said actuator means includes a plurality of piston rods, each of said piston rods being connected with one of said pistons and extending through said second member into engagement with said reaction disc.

25. A force transmitting assembly as set forth in claim 23 wherein said actuator means includes a plurality of housings connected with said second member, each of said pistons of said plurality of pistons being disposed in one of said housings of said plurality of housings.

26. A force transmitting assembly operable between a plurality of engaged conditions in which said force transmitting assembly is operable to transmit forces of different magnitudes and a disengaged condition in which said force transmitting assembly is ineffective to transmit force, said force transmitting assembly comprising a first member, a circular force transmitting disc connected with said first member, a second member, a circular reaction disc connected with said second member, said first member and said force transmitting disc being rotatable relative to said second member and said reaction disc when said force transmitting assembly is in the disengaged condition, and actuator means for operating said force transmitting assembly between the disengaged condition and the plurality of engaged conditions, said actuator means includes a plurality of pistons having central axes offset from and extending parallel to an axis about which said first member and said force transmitting disc are rotatable, said circular reaction disc is disposed adjacent to a first side of said second member and said plurality of pistons are disposed adjacent to a second side of said second member.

27. A force transmitting assembly as set forth in claim 26 wherein said actuator means includes a plurality of piston rods, each of said piston rods being connected with one of said pistons and extending through said second member into engagement with said reaction disc.

28. A force transmitting assembly as set forth in claim 26 wherein said actuator means includes a plurality of housings connected with said second side of said second member, each of said pistons of said plurality of pistons being disposed in one of said housings of said plurality of housings.

29. A force transmitting assembly operable between a plurality of engaged conditions in which said force transmitting assembly is operable to transmit forces of different magnitudes and a disengaged condition in which said force transmitting assembly is ineffective to transmit force, said force transmitting assembly comprising a first member, a circular force transmitting disc connected with said first member, a second member, a circular reaction disc connected with said second member, said first member and said force transmitting disc being rotatable relative to said second member and said reaction disc when said force transmitting assembly is in the disengaged condition, a spring assembly connected with said second member and operable to urge said reaction disc and force transmitting disc into engagement with each other to urge said force transmitting assembly away from the disengaged condition toward an engaged condition, and actuator means for operating said force transmitting assembly between the plurality of engaged conditions, said actuator means including a first piston area against which fluid pressure is applied when said force transmitting assembly is in a first engaged condition in which said force transmitting assembly is effective to transmit force of a first magnitude and a second piston area against which fluid pressure is applied when said force transmitting assembly is in a second engaged condition in which said force transmitting assembly is effective to transmit force of a second magnitude, said first and second piston areas being disposed in a first axial end portion of said force transmitting assembly, said first piston area being larger than said second piston area.

30. A force transmitting assembly as set forth in claim 29 further including an end section axially offset to the first side of said reaction and force transmitting discs and connected with said reaction discs, said end section including first and second recesses, a first piston disposed in said first recess and a second piston disposed in said second recess, said first piston area being disposed on said first piston and said second piston area being disposed on said second piston.

31. A force transmitting assembly as set forth in claim 30 wherein said first piston area and said first piston have an annular configuration and are disposed radially outward of said second piston area and said second piston.

32. A force transmitting assembly as set forth in claim 29 wherein said actuator means includes a first annular member disposed in a coaxial relationship with said circular force transmitting disc and with said circular reaction disc, said first annular member having an annular piston section and an annular cylinder section, a second annular member disposed in a coaxial relationship with said first annular member, said second annular member having an annular piston section which is at least partially enclosed by said annular cylinder section of said first annular member, said second annular member having an annular cylinder section which at least partially encloses said annular piston section of said first annular member, said first piston area being disposed on said annular piston section of said first annular member and said second piston area being disposed on said annular piston section of said second annular member.

33. A force transmitting assembly as set forth in claim 29 wherein said first and second piston areas have an annular configuration and are disposed in a coaxial relationship with said force transmitting disc and said reaction disc.

34. A force transmitting assembly operable between a plurality of engaged conditions in which said force transmitting assembly is operable to transmit forces of different magnitudes and a disengaged condition in which said force transmitting assembly is ineffective to transmit force, said force transmitting assembly comprising a first member, a circular force transmitting disc connected with said first member, a circular reaction disc, said first member and said force transmitting disc being rotatable relative to said reaction disc when said force transmitting assembly is in the disengaged condition, a first annular member connected with said reaction disc and disposed in a coaxial relationship with said circular force transmitting disc and with said circular reaction disc, said first annular member having an annular piston section and an annular cylinder section, a second annular member disposed in a coaxial relationship with said first annular member, said second annular member having an annular piston section which is at least partially enclosed by said annular cylinder section of said first annular member, said second annular member having an annular cylinder section which at least partially encloses said annular piston section of said first annular member, a first annular piston area being disposed on said annular piston section of said first annular member and a second annular piston area being disposed on said annular piston section of said second annular member, a first fluid passage connected with one of said first and second annular members to conduct fluid pressure to a first cylinder chamber which is at least partially formed between said annular piston section on said first annular member and said annular cylinder section on said second annular member, and a second fluid passage connected with one of said first and second annular members to conduct fluid pressure to a second cylinder chamber which is at least partially formed between said annular piston section on said second annular member and said annular cylinder section on said first annular member.

35. A force transmitting assembly as set forth in claim 34 wherein said first piston area is larger than said second piston area.

* * * * *